(12) United States Patent
Quinn

(10) Patent No.: US 8,313,607 B2
(45) Date of Patent: Nov. 20, 2012

(54) EXPANSION REPAIR COUPLING

(75) Inventor: Gregory F. Quinn, Fullerton, CA (US)

(73) Assignee: National Diversied Sales, Inc., Lindsay, CA (US)

( * ) Notice: Subject to any disclaimer, the term of this patent is extended or adjusted under 35 U.S.C. 154(b) by 208 days.

(21) Appl. No.: 12/940,741

(22) Filed: Nov. 5, 2010

(65) Prior Publication Data

US 2011/0048612 A1 Mar. 3, 2011

Related U.S. Application Data

(62) Division of application No. 11/787,663, filed on Apr. 16, 2007, now abandoned.

(51) Int. Cl.
*F16L 47/00* (2006.01)
*B29C 65/48* (2006.01)

(52) U.S. Cl. .......... 156/293; 156/94; 156/294; 156/423; 156/295; 285/30; 285/31; 285/113; 285/238; 285/371; 285/398; 285/302

(58) Field of Classification Search .............. 156/94, 156/98, 294, 295, 423; 285/30, 31, 113, 285/238, 371, 398
See application file for complete search history.

(56) References Cited

U.S. PATENT DOCUMENTS

| | | |
|---|---|---|
| 2,767,564 A | 6/1954 | Green |
| 3,944,260 A | 3/1976 | Petroczky |
| 4,013,309 A | 3/1977 | Quick |
| 4,109,944 A * | 8/1978 | Curtin ........................ 285/373 |
| 4,299,413 A | 11/1981 | Neher |
| 4,386,796 A | 6/1983 | Lyall et al. |
| 4,519,637 A | 5/1985 | Folkers |
| 4,687,232 A | 8/1987 | Zimmerman |
| 5,082,313 A | 1/1992 | Bryant et al. |
| 5,375,888 A | 12/1994 | Ikeda |
| 5,443,096 A | 8/1995 | King |
| 5,624,139 A * | 4/1997 | Van Kooten ................... 285/31 |
| 6,692,035 B2 | 2/2004 | Baruh |
| 6,830,268 B2 | 12/2004 | Krausz et al. |

* cited by examiner

*Primary Examiner* — Christopher Schatz
(74) *Attorney, Agent, or Firm* — David J. Pitman; Fulwider Patton LLP

(57) ABSTRACT

An expansion repair coupling for interconnecting two facing ends of a cut pipe comprises a tubular body, a spigot slidably and rotatably received therein and a locking mechanism to selectively lock or unlock the rotation of the tubular body relative to the spigot. An end of the spigot extends outward from the tubular body to receive a coupling that connects to one end of the cut pipe. A radially enlarged section on the spigot has a sealing mechanism that sealably engages an interior surface of the tubular body. The locking mechanism, engaged by collapsing the spigot into the tubular body or disengaged by extending the spigot therefrom, facilitates a push and twist connection at both ends of the pipe to wipe the adhesive disposed therebetween and obtain a better seal. Preferably, the locking mechanism comprises a socket having spigot engaging members that cooperatively engage socket engaging members on the spigot.

2 Claims, 7 Drawing Sheets

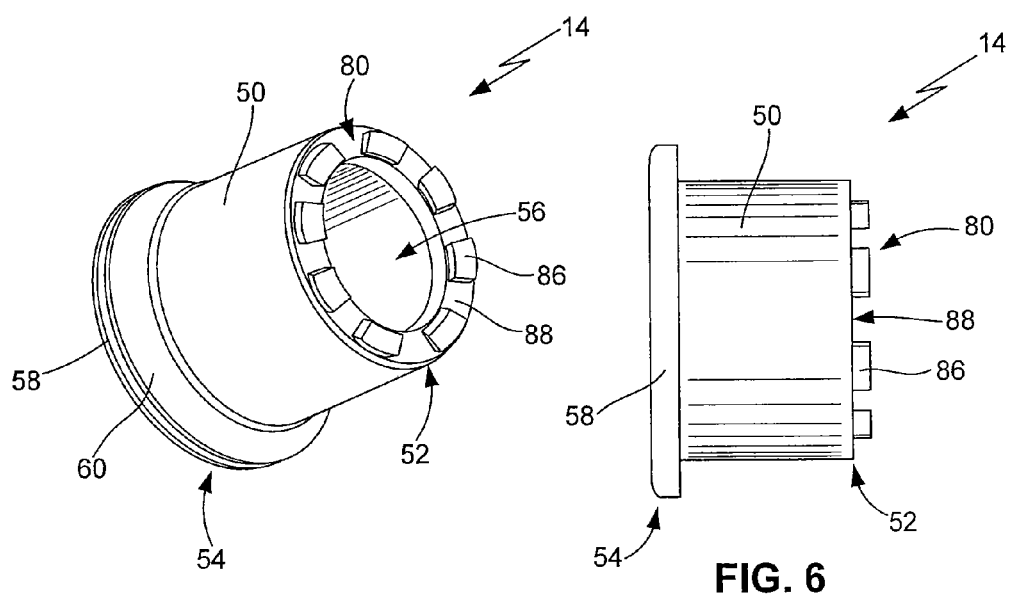
FIG. 5
FIG. 6
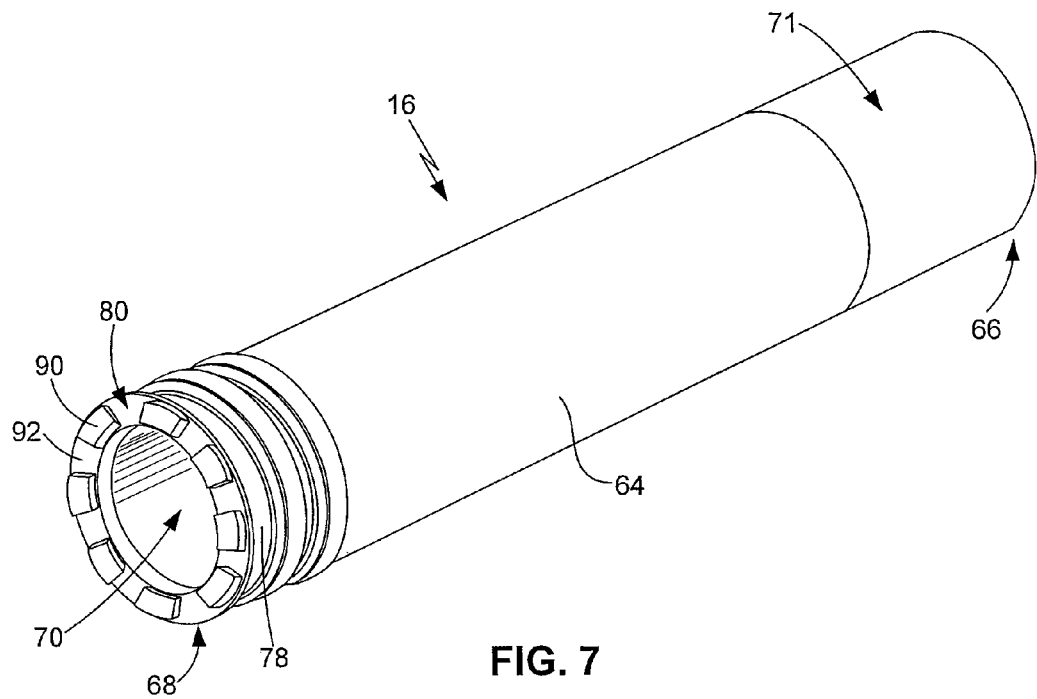
FIG. 7

EXPANSION REPAIR COUPLING

CROSS-REFERENCES TO RELATED APPLICATIONS

The present application is a divisional application of application Ser. No. 11/787,663 filed Apr. 16, 2007, the content of which is incorporated herein by reference.

FIELD OF THE INVENTION

The field of the present invention relates generally to coupling assemblies configured for field repair of a section of damaged pipe. More particularly, the present invention relates to such coupling assemblies that are configured for interconnecting the two ends of a cut section of pipe. Even more particularly, the present invention relates to such coupling assemblies that are configured for attaching both ends of the cut pipe to the coupling assembly with a push and twist motion so as to obtain an improved seal therebetween.

BACKGROUND OF THE INVENTION

Many piping systems utilize plastic or polyvinylchloride ("PVC") pipe to transmit the system fluids from one location to another due to its relatively low cost and ease of installation. The use of such materials is particularly prevalent in the low pressure water piping systems utilized in irrigation or sprinkler systems for home and business locations. Typically, lengths of pipes are joined without threading by utilizing standard couplings that attach to the end of a section of pipe with a solvent cement or like adhesive and the piping system is buried beneath the ground. The standard piping system coupling comprises a small section of pipe having opposite facing open ends with inner diameters sufficient for the ends of the pipes to be joined to fit snugly within the coupling. The ends of the pipes typically abut against a small inner disposed wall that prevents the pipe from extending through the coupling. To secure the pipe to the coupling, a quantity of solvent cement is applied to the outer surface of the pipe at its end and/or to the inner diameter of one side of the coupling before the end of the pipe is inserted into the coupling. Although a seal between the pipe and coupling can be obtained by merely inserting the pipe linearly into the coupling, it is well known that even a very small piece of plastic, rock, dirt or other debris can result in a longitudinally disposed channel that will create a path for a leak. As a result, the generally recommended procedure for joining the pipe to the coupling is to push the end of the pipe into the coupling and then manually twist the pipe and/or coupling relative to the other so as to wipe the adhesive around the outside of the pipe and inside of the coupling and disrupt or eliminate channels by capturing and surrounding any debris left on the end of the pipe.

Unfortunately, underground plastic or PVC pipes are known to be relatively easily damaged due to contact with a shovel, hoe or other implement or to otherwise split or break causing the fluids therein to leak out. As well known in the art and described in U.S. Pat. No. 6,692,035 to Baruh and U.S. Pat. No. 4,687,232 to Zimmerman, to repair a section of broken pipe that is located underground it is first necessary to isolate the broken section by excavating an area around the break and then cut the pipe to remove the section of damaged pipe, thereby leaving the pipe with two facing, generally aligned ends. The conventional manner of repairing the pipe is to insert a section of pipe of sufficient length to fit within the removed section. To join to the ends of the cut pipe, the repair pipe will have a standard pipe coupling at each end that is sized and configured to receive the ends of the pipe where the section was removed. Joining the coupling at one end of the repair pipe to one end of the cut pipe can generally be done in the same push and twist manner used for installing new pipe since it is possible to twist the coupling relative to the fixed cut pipe. Joining the coupling at the second end of the repair pipe to the opposite end of the cut pipe is generally much more difficult. Typically, the desired twist motion to obtain a seal cannot be achieved because the coupling at the first end of the repair pipe is now joined to the first end of the fixed, buried cut pipe. In addition, because the repair pipe is sized to fit within the cut area, the second end of the cut pipe and the corresponding end of the repair pipe must be bent at an angle in order for the end of the cut pipe to go inside the coupling. In order to have sufficient freedom of movement to achieve the necessary angle, the person repairing the pipe must excavate a much larger area around the broken pipe than would otherwise be necessary to just fit in the repair pipe. If the excavated area is large enough and two or more people are available, an insert and twist motion can be achieved at both ends of the repair pipe by placing adhesive at both free ends of the cut pipe or in both couplings, sufficiently bending both of the pipe ends to direct them into the couplings at the opposite ends of the repair pipe at the same time and then twisting the repair pipe, so as to twist both couplings, before the adhesive has a chance to set.

As set forth above, the conventional method of repairing a section of damaged underground pipe is somewhat difficult and, if paying someone to perform the work, expensive to accomplish. In addition to the time and cost of digging an enlarged excavated area, the digging carries an inherent risk of making contact with the piping system elsewhere and causing a second break. Bending the pipe a sufficient amount to be able to insert the end of the pipe into the repair coupling can result in a split or break in the pipe, particularly if the pipe is older and, therefore, more likely to be relatively brittle. The problems with bending the buried pipe are somewhat exasperated when dealing with larger diameter pipes, as these are more difficult to bend, and pipes which are buried deeper below the surface of the ground. Another problem with the conventional manner of repairing damaged, buried plastic or PVC pipe is that the repair person must ensure that the repair pipe, with couplings at both its ends, is of the proper length. If the repair pipe is too long, then it will not fit into the cut section space or, if forced to fit, it will place significant stress on the piping system. If the repair pipe is too short, then it will not join to both ends or, even if it does join both ends, it will not have sufficient joining area to provide the desired seal. In addition to the above, the inability to twist both ends of the coupling and/or cut pipe creates the potential for debris-formed channels that will result in a leak.

To address the problems associated with the conventional manner of repairing a damaged section of buried pipe or the like, a variety of different repair couplings or systems have been developed, a number of which have been patented. One type of pipe repair system comprises one or more clamping mechanisms which fit over the pipe to engage the pipe and seal against the break. Another type of pipe repair system utilizes a pair of clamping mechanisms that connect to the opposing free ends of a cut pipe so as to span a repair pipe across the cut section of pipe. Yet another type of pipe repair system comprises a collapsible repair coupling that fits within the cut section of pipe and then extends to connect the two generally aligned, spaced apart ends of the pipe. Examples of patents directed to this latter type of pipe repair system includes U.S. Pat. No. 4,687,232 to Zimmerman, which describes a pipe slip joint system having an expandable pipe coupling comprising a joint housing that encloses a tubular piston which protrudes from one end of the housing. The piston is compressed and inserted into a small cutaway section of an existing pipe and then expanded to fit over the two free ends of pipe to form a continuous water-tight connection. Another such patent is U.S. Pat. No. 4,013,309 to Quick, which describes a repair kit for plastic pipe having two or three tubular components, one of which is a coupling sleeve, that are configured for telescopic assembly to the adjacent ends of a broken pipe. The coupling sleeve spans the break so that its end portions can be adhesively bonded to the exterior of the ends of the broken pipe. Yet anther example of an extending type of device is U.S. Pat. No. 4,386,796 to Lyall, et al., which discloses a pipe repair coupling comprising a barrel that telescopically receives a hollow piston, formed with a plurality of annular O-ring grooves that each have an O-ring which seals against the interior wall of the barrel. One end of the barrel has a coupling that engages one end of the cut pipe. The piston is telescoped into the barrel such that its outwardly extending, free end may be connected to a standard coupling that engages the other end of the cut pipe. A different type of device is set forth in U.S. Pat. No. 6,692,035 to Baruh, which discloses a pipe coupling device that comprises an elongated housing defining an elongated bore therein that has a stop disposed between the first and second ends of the housing. The stop is located approximately twice the distance from one end of the housing than it is from the other end. In use, the user applies adhesive to the inside surfaces of the coupling, inserts the longer end of the housing onto one end of the cut pipe, bends that end of the pipe out of alignment with the opposite end of the cut pipe and then slides the other end of the housing over the free end of the cut pipe.

Although the foregoing devices can be utilized to join two opposing, spaced apart ends of a cut section of pipe, none of these devices or any other device known to the present inventor or assignee provides a pipe repair coupling that is configured to allow the user to engage and twist both ends of the coupling relative to the cut pipe so as to eliminate channels in the adhesive which can result in a leak. What is needed, therefore, is a repair coupling for joining two ends of a cut section of pipe that can be placed between the two ends so as to join the pipe ends and allow the coupling to be twisted relative to both ends of the pipe to wipe the adhesive around the inside surface of the coupling and the outside surface of the ends of the pipe to prevent channels that can result in a leak. The preferred pipe repair coupling should include a mechanism that allows the user to push and twist one end of the coupling onto a first pipe end and, with the coupling extended between the pipe ends, then push and twist the coupling onto the second pipe end to sealably engage both ends of the pipe. The preferred pipe repair coupling should also be configured to be easily and quickly installed between the ends of a cut section of pipe to connect the pipe ends without having to bend the pipe to be repaired. Preferably, the pipe repair coupling of the present invention should be configured to provide a sealed contiguous channel between two ends of a cut section of pipe. The preferred pipe repair coupling should also be adaptable to a wide range of pipe sizes and configurations.

SUMMARY OF THE INVENTION

The expansion repair coupling of the present invention solves the problems and provides the benefits identified above. That is to say, the present invention discloses an expansion repair coupling for use to join the opposing free ends of a section of cut pipe without having to bend the cut pipe and in a manner that facilitates twisting the coupling relative to the cut pipe so as to better seal the coupling to the cut pipe. In a preferred embodiment of the present invention, the expansion repair coupling of the present invention is configured to allow the user to twist the coupling relative to both ends of the cut pipe so as to wipe the adhesive around the inner surface of the coupling and the outer surface of the pipe ends to prevent formation of any channels that can cause a leak. The preferred expansion repair coupling is adapted to be placed between opposing, generally aligned ends of a cut section of pipe, attach to one of the pipe ends and then extend to the other pipe end, thereby avoiding the need to bend or otherwise change the angle of the pipe to place the coupling thereon. The expansion repair coupling of the present invention is adaptable to a wide range of pipe sizes and configurations. Use of the expansion repair coupling of the present invention provides a sealed, contiguous connection between two ends of a cut section of pipe to facilitate repair of the pipe.

In one general aspect of the present invention, the expansion repair coupling comprises a tubular body, a spigot received inside the tubular body so as to slidably and rotatably engage the tubular body and a locking mechanism for selectively interconnecting the tubular body and spigot to prevent rotation of the spigot and tubular body relative to each other. The tubular body has a first end, second end, outer surface and an interior sealing surface, which defines a bore through the tubular body in which the spigot is received. The spigot has a spigot body with a first end, a second end, a spigot bore through the spigot body and a radially enlarged section. A stop at the first end of the tubular body prevents the spigot from being pulled completely out of the tubular body. The radially enlarged section comprises a sealing mechanism for sealably engaging the interior sealing surface of the tubular body. In a preferred embodiment, the sealing mechanism is located at or near the second end of the spigot, which is axially received in the bore of the tubular body, and is configured to slidably and rotatably engage the interior sealing surface. In the preferred embodiment of the present invention, the sealing mechanism is a pair of spaced apart O-rings that are each received in an O-ring gland formed on the spigot body. The first end of the spigot projects axially outward from the first end of the tubular body to receive one end of a standard coupling. The other end of the coupling receives one end of the cut pipe. When the expansion repair coupling is in the unlocked condition, the spigot and tubular body rotate relative to each other. In a preferred embodiment, the outer surface of the tubular body is provided with a gripping mechanism, such as a plurality of longitudinally extending ribs, for better gripping the tubular body during use.

The locking mechanism, which is selectively engaged to place the expansion repair coupling in its locked condition, is configured to prevent rotation of the spigot and tubular body relative to each other. In a preferred embodiment, the locking mechanism comprises a socket at the second end of the tubular body that is configured to engage the spigot and prevent independent rotation thereof. The socket has a socket body with a first end received in the bore of the tubular body, a second end positioned at the second end of the tubular body and a socket bore through the socket and in axial alignment with the spigot bore. Preferably, the locking mechanism also comprises one or more longitudinally extending spigot engaging members on a socket face at the first end of the socket body and one or more longitudinally extending socket engaging members on a spigot face at the second end of the spigot body that are cooperatively configured to engage each other when the spigot is collapsed into the tubular body. Separating the spigot from the socket, by pulling the spigot outwardly from the tubular body, disengages the locking mechanism and allows rotation of the spigot and tubular body relative to each other. In the preferred embodiment, the second end of the socket body has a cap with an inwardly facing shoulder that abuts the second end of the tubular body. In alternative embodiments, the socket components of the locking mechanism are attached to or integral with the interior sealing surface of the tubular body, thereby eliminating the socket, and engaged by cooperatively configured components at the second end of the spigot.

A user utilizes the preferred embodiment of the expansion repair coupling of the present invention by first attaching one end of a standard coupling to the first end of the spigot body and then engaging the locking mechanism by collapsing the spigot into the tubular body to place the expansion repair coupling in its locked condition. The user can use the length of the collapsed expansion repair coupling and attached standard coupling to size the cut for the damaged section of pipe and then cut the pipe, thereby obtaining a cut pipe opening, a first pipe end and a second pipe end. With an adhesive material placed on the coupling and/or the first pipe end, the user grips the outer surface of the tubular body and pushes the coupling onto the first pipe end. The user then twists the tubular body to rotate the coupling on the first pipe end and wipe the adhesive therebetween to eliminate any channels that may develop because of small pieces of plastic, dirt or other debris. Then the user places adhesive on the second pipe end and/or inside the socket bore and, while gripping the tubular body, pushes the socket bore onto the second pipe end. This separates the socket from the spigot, disengages the locking mechanism to place the expansion repair coupling in its unlocked condition and allows the tubular body to rotate relative to the spigot, which is fixed to the first pipe end. The user then twists the tubular body to rotate the socket bore on the second pipe end and wipe the adhesive therebetween to eliminate any channels that may cause a leak.

Accordingly, a primary objective of the present invention is to provide an expansion repair coupling and method of use that provides the advantages discussed above and overcomes the disadvantages and limitations associated with presently available repair couplings and their methods of use.

It is also an important object of the present invention to provide an expansion repair coupling that is configured to be received between the opposing free ends of a cut pipe so as to interconnect the pipe ends without bending the pipe and in a manner that allows the user to twist the expansion repair coupling at both ends of the pipe so as to obtain an improved seal.

It is also an important object of the present invention to provide an expansion repair coupling that simplifies the repair of a damaged section of pipe so as to reduce the amount of time and work required to effectuate the repair of the pipe.

It is also an important object of the present invention to provide an expansion repair coupling that has a locking mechanism which selectively allows or prevents rotation of components of the expansion repair coupling relative to each other so that the ends thereof may rotatably engage the free ends of a cut section of pipe to wipe the adhesive around the pipe and prevent the formation of channels that will result in a leak.

It is also an important object of the present invention to provide an expansion repair coupling that is adaptable to a wide range of pipe sizes and configurations.

In accordance with one aspect of the present invention, an expansion repair coupling comprises a tubular body having an interior sealing surface defining a bore, a spigot having a first end that extends outwardly of one end of the tubular body and a second end that has a radially enlarged section which is slidably received within the bore, a sealing mechanism at the enlarged section of the spigot that sealably engages the sealing surface, a socket at the opposite end of the tubular body that receives the other end of the cut pipe and a locking mechanism at the adjacent ends of the spigot and socket which selectively prevents rotation of the tubular body relative to the spigot.

In accordance with another aspect of the present invention, a method of repairing a section of damaged pipe using an expansion repair coupling having a tubular body, spigot and socket comprises the steps of placing a standard coupling on a first end of the spigot body, collapsing the spigot into the tubular body to place the expansion repair coupling in its locked condition, cutting the pipe to remove the damaged section of pipe, placing the expansion repair coupling between the two ends of the cut pipe, pushing the standard coupling onto a first pipe end, twisting the tubular body to rotate the coupling on the pipe and wipe the adhesive therebetween, pulling on the tubular body to release the locking mechanism and then pushing the tubular body towards the second pipe end to receive the second pipe end into the socket while twisting the tubular body so as to effectuate a sealed connection between the socket and the second pipe end in order to sealably interconnect the two pipe ends.

The above and other objectives and aspects of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention:

FIG. 5 is a side perspective view of the socket utilized with the expansion repair coupling of FIG. 2;

FIG. 6 is a side view of the socket of FIG. 6;

FIG. 7 is a side perspective view of the spigot utilized with the expansion repair coupling of FIG. 2 shown without the O-ring seals;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures and drawings are merely illustrative of a preferred embodiment and represents one of several different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein are primarily directed to the present invention being utilized with water supply, irrigation and sprinkler systems having plastic or PVC pipe, those skilled in the art will readily understand that this is merely for purposes of simplifying the present disclosure and that the present invention is not so limited, as the present invention may be equally applicable for use with other types of fluid distribution systems.

An expansion repair coupling that is manufactured out of the components and configured pursuant to a preferred embodiment of the present invention is shown generally as 10 in FIGS. 2 and 10-12. As explained in more detail below, the preferred embodiment of expansion repair coupling 10 primarily comprises a tubular body 12, a socket 14 at one end of tubular body 12 and a spigot 16 that is slidably disposed in the opposite end of tubular body 12. In this embodiment, the inward end of spigot 16 is configured to selectively engage the inward end of socket 14 so as to prevent rotational movement of spigot 16 relative to tubular body 12 and socket 14. Although use of socket 14 to provide the locking mechanism with spigot 16 is preferred, various other configurations of expansion repair coupling 10 are also available to achieve the desired selective rotational movement of spigot 16 relative to tubular body 12. For instance, as set forth below, in an alternative configuration tubular body 12 is provided with an integrally formed mechanism that cooperates with the inward end of spigot 16 to selectively lock or unlock the rotation of spigot 16 relative to tubular body 12 and tubular body 12 relative to spigot 16. Other configurations are also possible to achieve the desired push and twist operation at both ends of expansion repair coupling 10.

Figure 1:
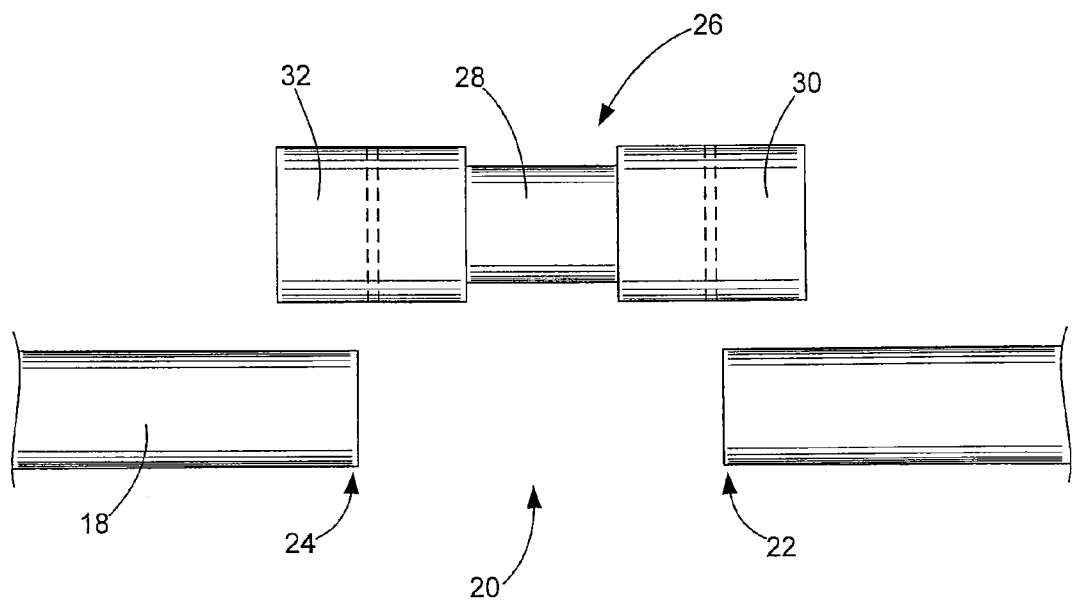
FIG. 1 is a side view of a section of cut pipe and a prior art repair pipe assembly configured to join the free ends of the cut pipe.

Expansion repair coupling 10 is utilized to repair a section of pipe that has been damaged or is otherwise leaking. FIG. 1 shows one example of a prior art, conventional method of repairing a damaged section, which has been removed, of pipe 18. With the damaged section removed, the user is left with a cut pipe opening 20 disposed between two ends, shown as first end 22 and second end 24, of pipe 18 that are generally axially aligned with each other. A conventional repair pipe assembly 26, shown above the cut pipe opening 20, comprises a section of repair pipe 28 having a first coupling 30 at one end and a second coupling 32 at the opposite end. In FIG. 1, first 30 and second 32 couplings are standard couplings, which are very familiar to those skilled in the art, having two opposite facing open ends, one end of which faces toward repair pipe 28 and is attached thereto with adhesive or is integral therewith. Typically, repair pipe 28 is the same inner diameter as pipe 18 and the outwardly facing open ends of first 30 and second 32 couplings have an inner diameter sufficient to snugly receive first 22 and second 24 ends of pipe 18 and be secured thereto by an adhesive. As discussed above, utilizing the conventional repair pipe assembly 26, the user must bend one or both of ends 22 and 24 of pipe 18 in order to insert ends 22/24 into couplings 30/32, respectively, thereby requiring sufficient excavation around pipe 18 to obtain the necessary bending. Any such bending of pipe 18 to connect repair pipe assembly 26 must be done with care to avoid cracking, breaking or otherwise further damaging pipe 18. As also set forth above, one of the primary disadvantages of the conventional pipe repair system, as well as other prior art pipe repair systems, is that it is either not possible or very difficult to twist the couplings 30/32 relative to both ends 22/24 of pipe 18 in order to wipe the adhesive around so as to prevent the formation of channels in the adhesive bond that will lead to leaks. Expansion repair coupling 10 of the present invention is configured to be placed in cut pipe opening 20 and manipulated, as set forth below, to join ends 22 and 24 of pipe 18 without bending pipe 18 and in a manner that allows the user to achieve the desired twisting action at both ends 22/24 of pipe 18.

Figure 2:
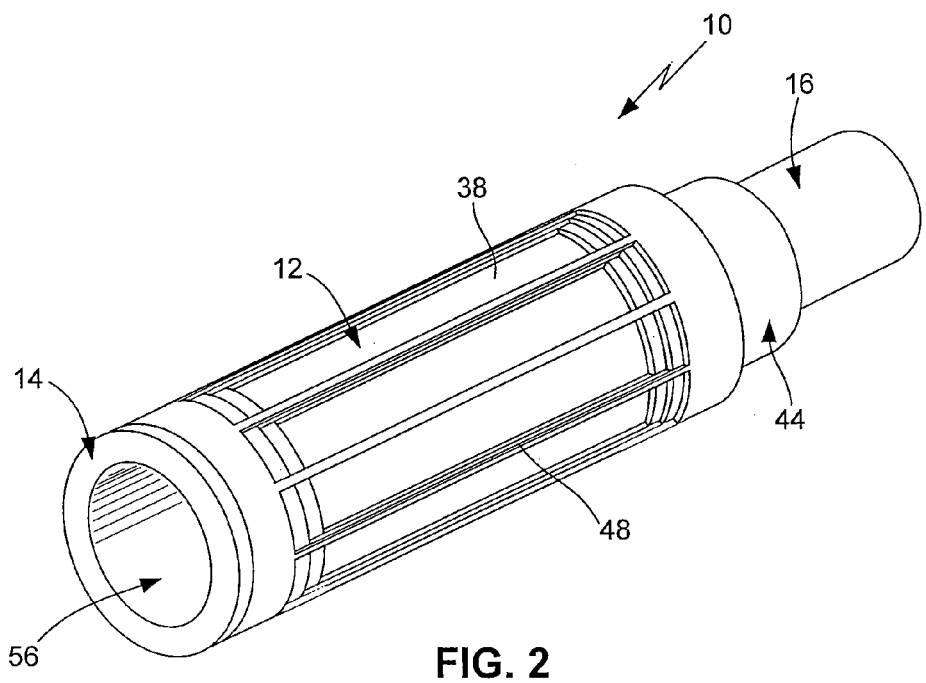
FIG. 2 is a side perspective view of an expansion repair coupling configured according to a preferred embodiment of the present invention.
Figure 3:
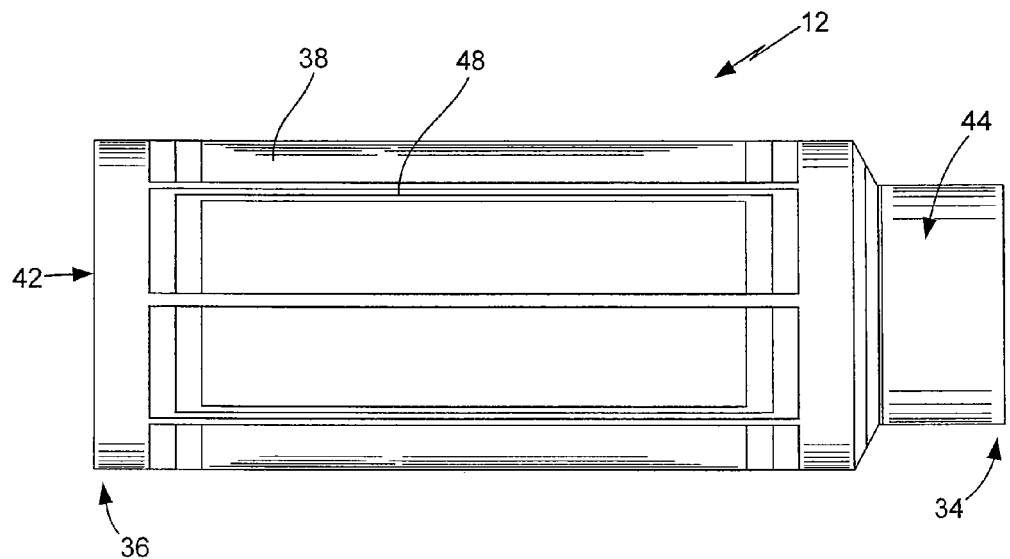
FIG. 3 is a side view of the tubular body of the expansion repair coupling of FIG. 2.
Figure 4:
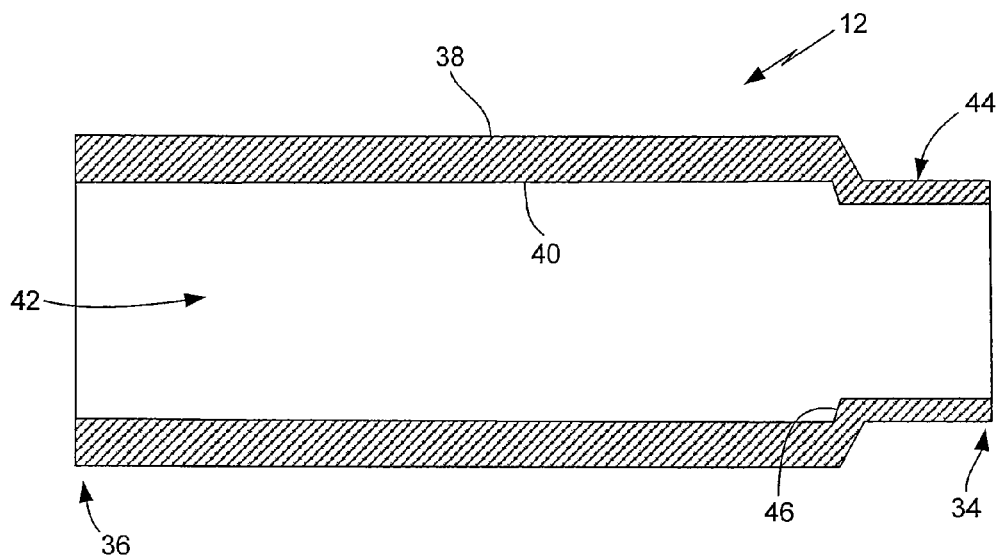
FIG. 4 is a cross-sectional side view of the tubular body of FIG. 3.
Figure 10:
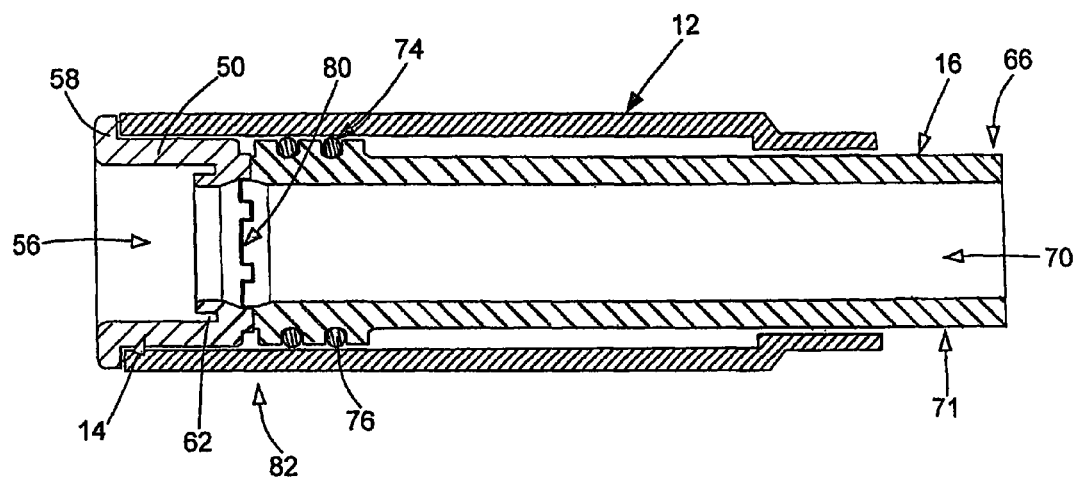
FIG. 10 is a cross-sectional isolated side view socket and second end of the spigot in the locked condition of FIG. 8 shown with the tubular body.
Figure 11:
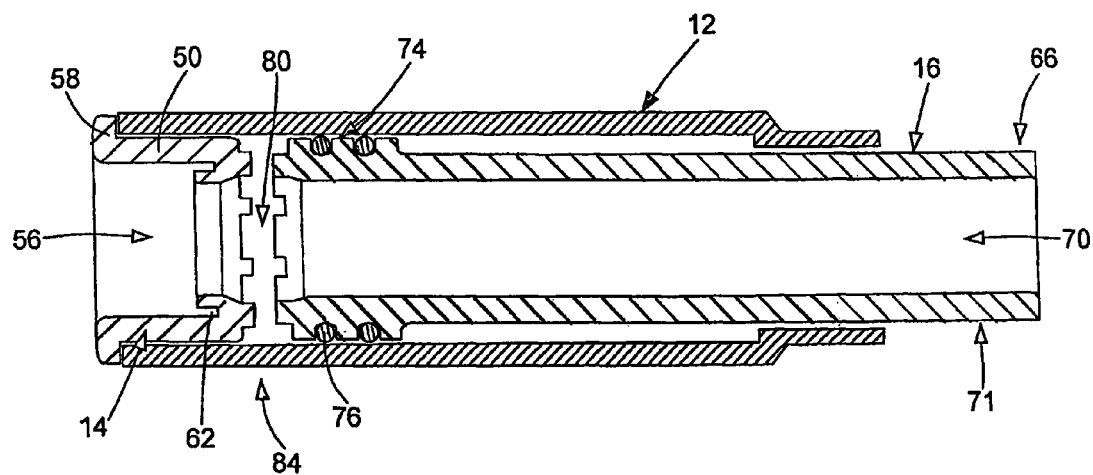
FIG. 11 is a cross-sectional isolated view of the socket and second end of the spigot in the expanded, unlocked condition shown with the tubular body.

As best shown in FIGS. 3 and 4, tubular body 12 has a first end 34, a second end 36, an exterior surface 38 and an interior sealing surface 40, which defines a bore 42 through tubular body 12. In a preferred embodiment, tubular body 12 is made from PVC or plastic material and configured to be elongated and generally cylindrically shaped, although other materials, configurations and shapes may also be suitable for tubular body 12. As best shown in FIGS. 2 and 10-11, a portion of spigot 16 is disposed in tubular body 12 at first end 34 and a portion of socket 14 is disposed in tubular body 12 at second end 36. As set forth in more detail below, at least a portion of interior sealing surface 40 of tubular body 12 is configured to be slidably, rotatably and sealably engaged by spigot 16. In the preferred embodiment, the cylindrical interior sealing surface 40 of elongated tubular body 12 defines a generally cylindrical bore 42 through tubular body 12. Preferably, the portion of bore 42 towards first end 34 is tapered from first end 34 to a distance equal to the length of socket 14, with the diameter being larger at the first end 34, to better receive and engage socket 14. Also in the preferred embodiment, first end 34 of tubular body 12 has a reduced diameter section 44 defining an interior shoulder or stop 46 inside tubular body 12 that prevents spigot 16 from sliding completely out of the first end 34 of tubular body 12. Preferably, reduced diameter section 44 is elongated and has an interior diameter slightly larger than spigot 16 so as to provide support to spigot 16 and prevent it from significantly flexing relative to tubular body 12. Socket 14 at second end 36 of tubular body 12, which extends into the second end 36 of tubular body 12, prevents spigot 16 from sliding out the second end 36. As a result, spigot 16 is configured to slidably, rotatably and sealably engage interior surface 40 of tubular body 12 between the inwardly extending socket 14 and the stop 46 defined by reduced diameter section 44.

As best shown in FIG. 12 and discussed in detail below, the ability of spigot 16 to slide between the inwardly extending socket 14 and the stop 46 at the first end 34 of tubular body 12 allows the user to fully collapse spigot 16 in tubular body 12, which engages the locking mechanism to prevent rotation of spigot 16 relative to tubular body 12, so that the user may place expansion repair coupling 10 within a provided pipe opening 20. Gripping the outer surface 38 of tubular body 12, the user then pushes spigot 16, with a coupling thereon or located on pipe 18, towards either first 22 or second 24 end of pipe 18 (the drawings and text herein show spigot engaging first end 22) while twisting expansion repair coupling 10 so that spigot 16 rotatably engages pipe 18 to seal the adhesive therebetween. Once the spigot end is sealed, the user then extends tubular body 12 relative to spigot 16 to push socket 14 towards and over the opposite end (i.e., second end 24) of pipe 18 while twisting tubular body 12 so that socket 14 rotatably engages the second end 24 of pipe 18. As such, unlike the prior art, the user is able to push and twist both ends of expansion repair coupling 10 onto their respective ends 22/24 of pipe 18 to achieve the desired wiping of the adhesive between expansion repair coupling 10 and pipe 18 for an improved seal, thereby avoiding the known problems with particles of dirt, plastic or other debris creating a channel which will result in a leaking connection and, therefore, a failed repair.

Preferably, outer surface 38 of tubular body 12 is configured with a gripping mechanism that makes it easier for the user to grip tubular body 12 when performing the desired push and twist locking action to repair pipe 18. As best shown in FIGS. 2 and 3, the preferred embodiment of the gripping mechanism comprises a plurality of generally longitudinally disposed, outwardly extending bars or ribs 48. As well known in the art, various other configurations for the gripping mechanism can also be utilized, including a plurality of raised dots or bumps, a rough surface, a grid pattern or like surface treatments. The gripping mechanism should be configured to provide a positive grip for the user as he or she pushes, pulls and twists expansion repair coupling 10 into place when gluing to the ends 22/24 of pipe 18, particularly when the user's hands are wet and muddy (as may typically be the situation when performing the repair work).

A preferred configuration for socket 14, best shown in FIGS. 5 and 6, comprises a tubular socket body 50 having a first end 52 and a second end 54 defining a socket bore 56 through the socket body 50. As best shown in FIGS. 10 and 11, socket body 50 is sized and configured to be fixedly disposed within the second end 36 of tubular body 12. In the preferred configuration, a cap member 58 is disposed at the second end 54 of socket body to define an inward facing shoulder 60 that abuttingly engages the second end 36 of tubular body 12. With both tubular body 12 and socket 14 made out of PVC or plastic, socket body 50 is fixedly attached to the inner surface 40 of tubular body 12 utilizing threads, spin welding, adhesives and/or solvent welding during the manufacturing of expansion repair coupling 10 as may be appropriate and effective for the materials selected for these components. It may also be beneficial to form socket 14 integrally with tubular body 12. In the preferred embodiment, the outer diameter of cap member 58 is the same as the outer diameter of tubular body 12. The diameter of socket bore 56 is sized to receive one end (i.e., second end 24) of pipe 18 in socket body 50 with an appropriate adhesive material disposed between the end of pipe 18 and the interior wall of socket body 50, with the adhesive material placed on the second end 24 of pipe 18 and/or on the interior wall of socket body 50, to achieve the desired seal between expansion repair coupling 10 and pipe 18. In the preferred embodiment, the diameter of socket bore 56 tapers inward, with the diameter at second end 54 of socket body 50 being larger, to better receive and engage second end 24 of pipe 18. Also in the preferred embodiment, socket 14 is provided with an adhesive well 62, as shown in FIGS. 10 and 11, in socket bore 56 towards the first end 52 of socket body 50. Adhesive well 62 provides an internal trap for excess adhesive material between the socket 14 and the second end 24 of pipe 18 to ensure that the adhesive stays where it should be so the user does not end up with a glued together expansion repair coupling 10 which will not function as described herein.

Figure 8:
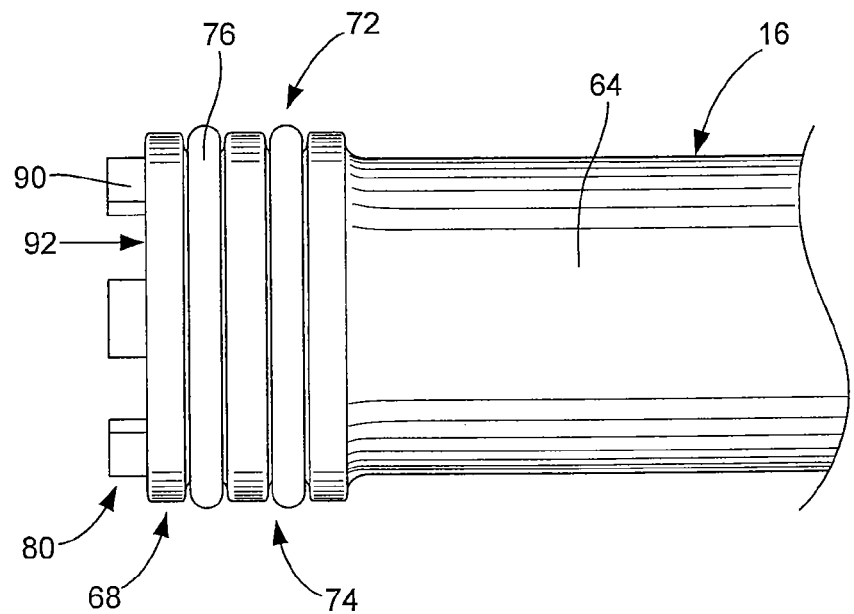
FIG. 8 is a side view of the spigot of FIG. 6.

A preferred configuration for spigot 16, best shown in FIGS. 7 and 8, comprises a tubular spigot body 64 having a first end 66 and a second end 68 defining a spigot bore 70 through the spigot body 64. As best shown in FIGS. 10 and 11, spigot body 64 is sized and configured to be axially disposed inside bore 42 at the first end 34 of socket body 12. The first end 66 of spigot body 64 is sized and configured to be received in one end of a standard coupling, such as first coupling 30, with one end (with first end 22 shown in the figures) of pipe 18 being received in the opposite facing end of first coupling 30. As such, it is generally important that the coupling area 71 near the first end 66 of spigot body 64 be as near perfectly round (for standard round couplings) as possible to be properly received in one of the outwardly facing open ends of first coupling 30. Typically, the outer and inner diameters of spigot body 64 will be generally the same as the outer and inner diameters of pipe 18 that is to be repaired, with the outer diameter of spigot body 64 having a slight narrowing taper from second end 68 to first end 66 to better be received in and engage the coupling 30. Spigot 16 has a radially enlarged section 72, comprising a sealing mechanism 74, towards the second end 68 of spigot body 64 for sealably engaging tubular body 12. Sealing mechanism 74 is configured to sealably, slidably and rotatably engage the interior sealing surface 40 of tubular body 12 to prevent leakage of fluid out expansion repair coupling 10. In a preferred embodiment, sealing mechanism 74 comprises one or more O-ring seals 76 disposed in one or more radially outwardly opening O-ring glands 78. In the preferred embodiment, shown in FIGS. 7-11, sealing mechanism 74 comprises a pair of longitudinally spaced apart, radially outwardly opening O-ring glands 78 that each receive an O-ring 76 that is configured to circumferentially sealably engage the interior sealing surface 40 of tubular body 12, as shown in FIGS. 10 and 11. When spigot 16 is axially received in tubular body 12, sealing mechanism 74 sealably and slidably engages the interior sealing surface 40 of tubular body 12 such that the first end 66 of spigot body 64 projects axially outward from the first end 34 of tubular body 12, as also best shown in FIGS. 10 and 11.

Figure 9:
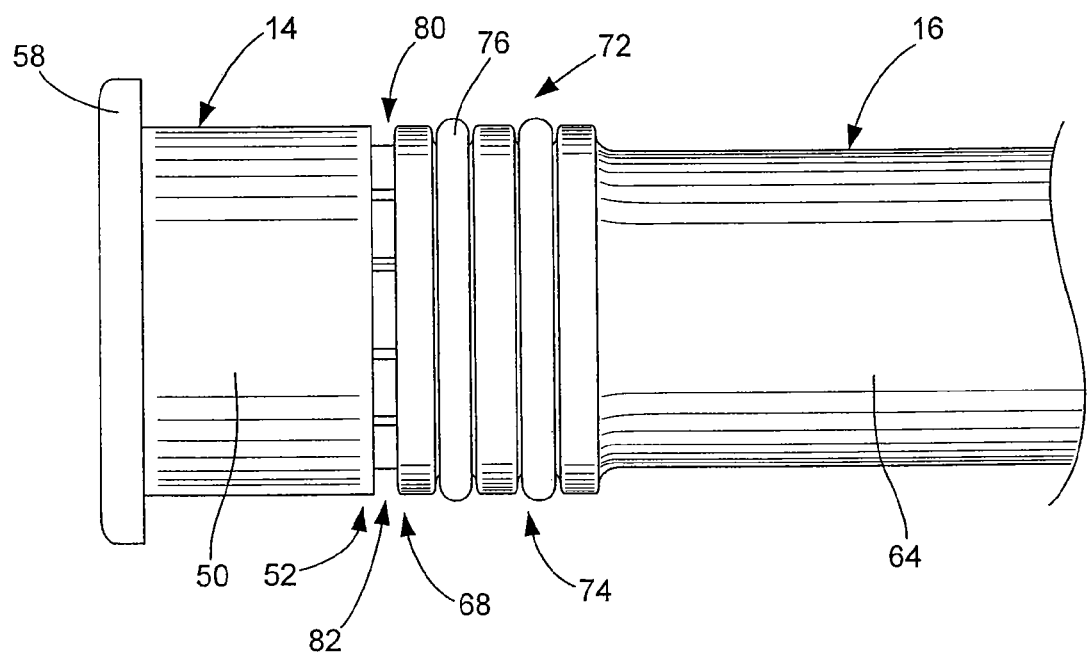
FIG. 9 is an isolated side view of the socket and the second end of the spigot shown in the locked condition without the tubular body.

As described above, expansion repair coupling 10 of the present invention is provided with a locking mechanism, shown generally as 80, that is configured to be selectively engaged and disengaged by the user to allow tubular body 12 and spigot 16 to rotate relative to each other so that the desired push and twist operation may be utilized. In the preferred embodiment, components of locking mechanism 80 are located on both socket 14 and spigot 16, with these components cooperatively configured so as to allow the selective engagement and disengagement of socket 14 and spigot 16 for rotation or no rotation of tubular body 12 and spigot 16 relative to each other. FIGS. 9 and 10 show locking mechanism 80 in its locked condition 82 and FIG. 11 shows locking mechanism 80 in its unlocked condition 84. In a preferred embodiment, locking mechanism 80 comprises one or more outwardly longitudinally extending spigot engaging members 86 on the socket face 88 at the first end 52 of socket body 50 and one or more outwardly longitudinally extending socket engaging members 90 on the spigot face 92 at the second end 68 of spigot body 64. As best shown in FIGS. 5 and 7, in the preferred embodiment socket 14 comprises a plurality of spaced apart, outwardly longitudinally extending spigot engaging members 86 on the socket face 88 and spigot 16 comprises a plurality of spaced apart, outwardly longitudinally extending socket engaging members 90 on the spigot face 92. As shown in FIG. 9, the outwardly longitudinally extending spigot engaging members 86 on socket 14 are sized and configured to be received between the spaced apart socket engaging members 90 on spigot 16 and the outwardly longitudinally extending socket engaging members 90 are sized and configured to be received between the spaced apart spigot engaging members 86 so as to lock socket 14 to spigot 16 and prevent rotational movement of tubular body 12 and spigot 16 relative to each other during part, as explained below, of the installation of expansion repair coupling 10 to repair pipe 18. As known to those skilled in the art, spigot engaging members 86 and socket engaging members 88 can be formed during the molding process of socket 14 and spigot 16, respectively and need to be of sufficient strength to not break during normal use.

Figure 12A:
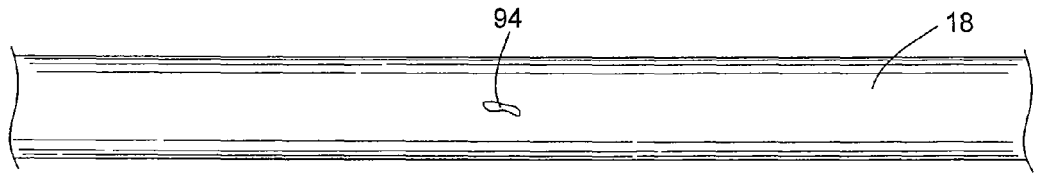
FIGS. 12A-12E are an illustration of the use of the expansion repair coupling of the present invention to repair a section cut or damaged pipe.
Figure 12B:
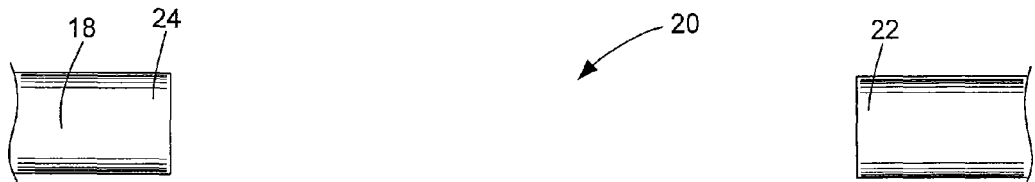
Figure 12C:
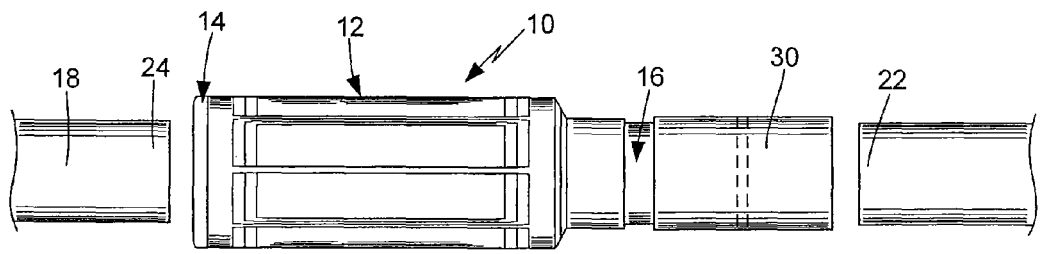

The use of the preferred embodiment of expansion repair coupling 10 of the present invention is illustrated in FIGS. 12A through 12E, which shows the progression from a damaged or broken pipe 18 to a repaired pipe 18 with expansion repair coupling 10. FIG. 12A shows a pipe 18 having a hole 94, which may be a crack or similar damage, that will leak water or other fluid. Initially, the user attaches one end of a standard coupling 30 to the coupling area 71 at the first end 66 of spigot body 64 using an adhesive appropriate for the materials, such as a solvent cement for PVC. The other, open end of coupling 30 should be sized and configured to receive first end 22 of pipe 18 with adhesive disposed therebetween. FIG. 12B shows pipe 18 cut in two places to form cut pipe opening 20, first end 22 and second end 24. The width of cut pipe opening 20 should only be slightly larger than the length of expansion repair coupling 10 in its collapsed, locked condition 82 with standard coupling 30 attached to the first end 66 of spigot body 64 so that expansion repair coupling 10 can be expanded to bridge cut pipe opening 20 between first end 22 and second end 24 of pipe 18. FIG. 12C shows expansion repair coupling 10 of the present invention placed, in its collapsed and locked condition 82 with coupling 30 attached thereto, in cut pipe opening 20 between the first 22 and second 24 ends of pipe 18. The user then places an appropriate adhesive inside the open end of coupling 30 and/or on the outer surface of first end 22 of pipe 18. Gripping the outer surface 38 of tubular body 12, with the locking mechanism 80 of expansion repair coupling 10 still in the collapsed and locked condition 82, the user then pushes coupling 30 onto first end 22 of pipe 18 and twists tubular body 12 to rotate the standard coupling 30 relative to first end 22 of pipe 18. Because locking mechanism 80 is in its locked condition 82, twisting tubular body 12 will rotate coupling 30 on pipe 18 and wipe the adhesive that is disposed therebetween to obtain the desired sealing (i.e., no channels formed by dirt, plastic or other debris).

Figure 12D:
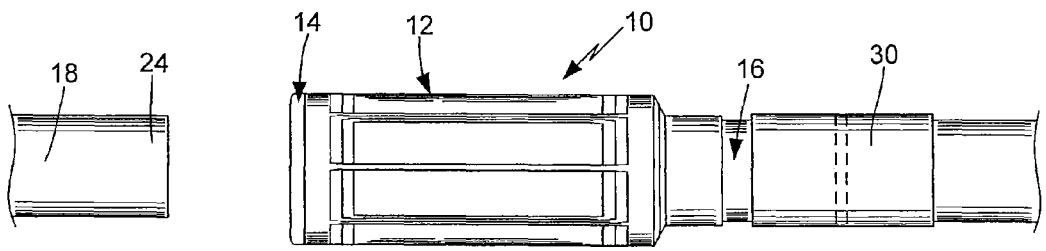
Figure 12E:
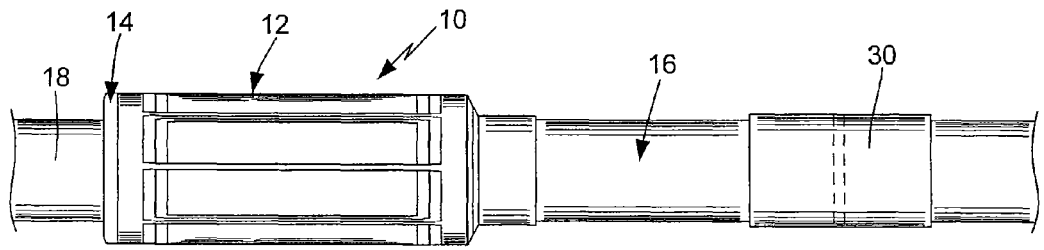

As shown in FIG. 12D, the above steps result in the collapsed expansion repair coupling 10 being securely mounted on and to the first end 22 of pipe 18. The user then applies an appropriate amount of adhesive to the outer surface of second end 24 of pipe 18 and/or to the interior wall at the second end 54 of socket body 50 to join the two components together. Then the user grips outer surface 38 of tubular body 12 and pulls tubular body 12 toward the second end 24 of pipe 18 to separate spigot engaging members 86 from the socket engaging members 90 and disengage locking mechanism 80. The user pushes and twists tubular body 12 toward second 24 of pipe 18 so that cap 58 and the second end 54 of socket body 50 rotatably engages the second end 24 of pipe 18. Typically, tubular body 12 is pushed toward the second end 24 of pipe 18 until the second end 24 generally abuts the adhesive well 62 area of socket body 50. Because the locking mechanism 80 is in the unlocked condition 84, with spigot engaging members 86 separated from the socket engaging members 90, tubular body 12 is free to rotate relative to spigot 16, which is anchored to first end 22 of pipe 18. As with the first end 22 of pipe 18, this rotation will wipe the adhesive between the tubular body 12 and second end 24 of pipe 18 to obtain the desired sealing. Unlike the prior art, the user does not have to bend pipe 18 and he or she is able to push and twist both ends of expansion repair coupling 10 onto their respective ends 22/24 of pipe 18 to achieve the desired wiping of the adhesive between expansion repair coupling 10 and pipe 18 for an improved seal. This ability to twist both ends avoids known problems with particles of dirt, plastic or other debris creating a channel which will result in a leaking connection and, therefore, a failed repair.

In addition to providing an improved sealing arrangement, expansion repair coupling 10 of the present invention is also easier to use. The user can easily determine how much of pipe 18 is necessary to be cut to obtain cut pipe opening 20 by merely placing the collapsed, locked expansion repair coupling 10, with standard coupling 30 attached to the first end 66 of spigot body 64, next to pipe 18 and marking the appropriate distance, which is slightly longer than the combined expansion repair coupling 10 and standard coupling 30. In addition, the narrow profile of expansion repair coupling 10, particularly relative to other repair coupling in the prior art, allows its use in situations where there are multiple pipes alongside each other, thereby not providing much room for accomplishing the repair. Expansion repair coupling 10 can be provided in a wide variety of different sizes and, if necessary, different configurations to match the configuration of pipe 18 that needs repair.

Figure 13:
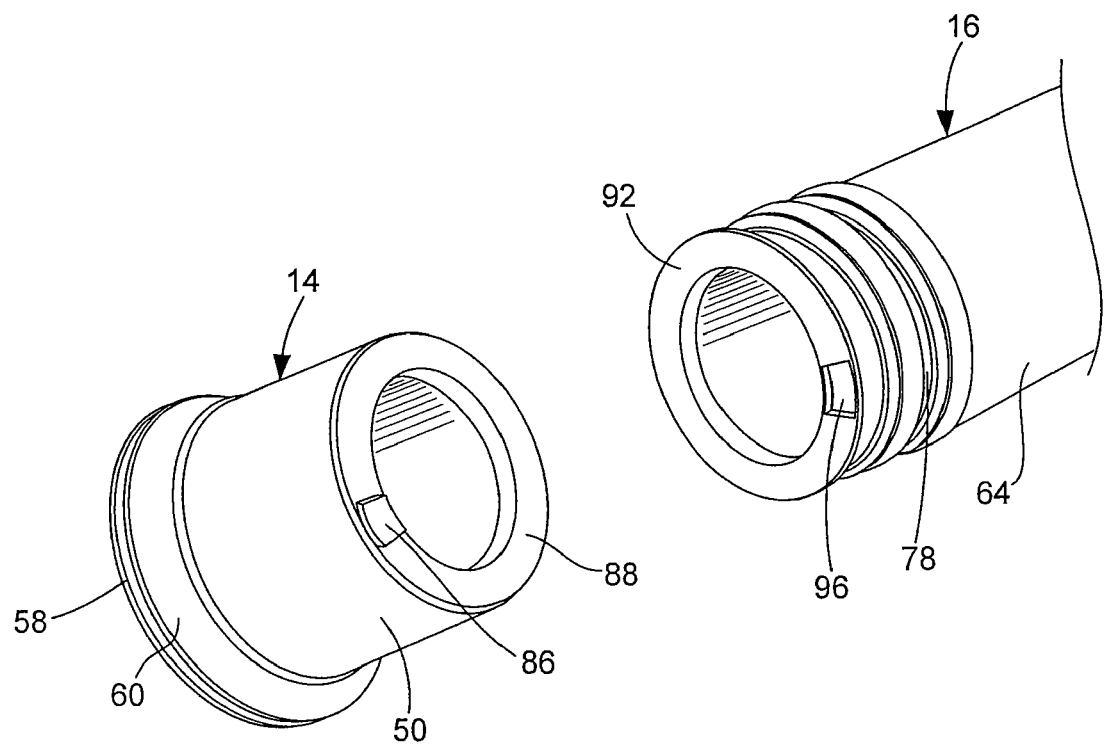
FIG. 13 is an side perspective view of the socket and spigot showing an alternative configuration for the locking mechanism.

As will be readily apparent to those skilled in the art, a number of variations to the locking mechanism 80 are available for expansion repair coupling 10 of the present invention to achieve the selective locking and dual end push/twisting described herein. In one alternative embodiment, shown in FIG. 13, socket face 88 has one spigot engaging member 86 and spigot face 92 has a cooperatively configured cavity 96 for receiving spigot engaging member 86 to lock the rotation of spigot 16 and tubular body 12 relative to each other. If desired, a plurality of such spigot engaging members 86 and cavities 96 can be utilized and/or one or more socket engaging members 90 can be provided on spigot face 92 to engage one or more cavities 96 located on socket face 88 (i.e., the reverse of the configuration shown in FIG. 13). In another alternative embodiment, socket face 88 can be provided with one or more spigot engaging members 86 and/or spigot face 92 can be provided with one or more socket engaging members 90 to engage each other. For instance, it may be sufficient that socket 14 has one spigot engaging member 86 on socket face 88 and spigot 16 has one socket engaging member 90 on spigot face to prevent rotation of spigot 16 and tubular body 12 relative to each other by placing the two engaging members 86 and 90 in abutting relation.

In yet another alternative configuration, expansion repair coupling 10 can be manufactured without socket 14, which in addition to the locking mechanism provides some benefits with regard to assembly, namely that tubular member 12 can be formed with the reduced diameter section 44, spigot 16 inserted from the second end 36 of tubular body 12 and then socket 14 attached to enclose the second end 68 of spigot body 64 in bore 42 of tubular body 12. In the alternative configuration, the components of locking mechanism 80 that are on socket 14 can be made integral with tubular body 12. For instance, the spigot engaging members 86 can be molded with tubular body 12 by incorporating their features into the section of interior sealing surface 40 towards the second end 36 of tubular body 12. Alternatively, spigot engaging members 86 or other features of locking mechanism 80 can be attached to or incorporated into (i.e., integral with) the second end 36 of tubular body 12 or be attached to or incorporated into tubular body 12 elsewhere (i.e., toward first end 34 thereof). In any of these alternatives, the features of locking mechanism 80 should be configured to cooperatively engage the corresponding features on spigot 16, which are located at the second end 68 of spigot body 64 but can be located elsewhere on spigot body 64 other than its second end 68.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

I claim:

1. A method of connecting a first pipe-end to a second pipe-end using an expansion repair coupling comprising a tubular body having an end portion sized to fit over the first pipe-end, and a spigot slidingly received within the tubular body, the spigot having an end portion projecting axially outwardly from the tubular body, the spigot end portion being sized to fit over the second pipe-end, the method comprising the steps of:
   a. applying adhesive material to either the second pipe-end or to the spigot end portion;
   b. pushing the spigot end portion over the second pipe-end to capture adhesive material between the spigot end portion and the second pipe-end;
   c. engaging a socket with the spigot to rotationally fix the tubular body to the spigot;
   d. twisting the tubular body, thereby rotating the spigot relative to the second pipe-end, and thereby wiping adhesive material between the spigot end portion and the second pipe-end;
   e. applying adhesive material to either the first pipe-end or to the tubular member end portion;
   f. disengaging the socket from the spigot to allow the tubular body to rotate with respect to the spigot;
   g. pushing the tubular body end portion over the first pipe-end to capture adhesive material between the tubular body end portion and the first pipe-end;
   h. rotating the tubular body relative to the first pipe-end without rotating the spigot, thereby wiping adhesive material between the tubular body end portion and the first pipe-end.

2. The method of claim 1, wherein engaging the socket with the spigot to rotationally fix the tubular body to the spigot includes sliding the tubular body over the spigot, thereby causing spigot engaging members to interconnect with socket engaging members.

* * * * *